(12) United States Patent
Bayram

(10) Patent No.: US 10,077,198 B2
(45) Date of Patent: Sep. 18, 2018

(54) ELECTROSORPTION SYSTEM FOR REMOVING FOREIGN MATERIALS FROM WATER

(71) Applicant: Edip Bayram, Konyaalti/Antalya (TR)

(72) Inventor: Edip Bayram, Konyaalti/Antalya (TR)

( * ) Notice: Subject to any disclaimer, the term of this patent is extended or adjusted under 35 U.S.C. 154(b) by 0 days.

(21) Appl. No.: 15/571,758

(22) PCT Filed: May 20, 2016

(86) PCT No.: PCT/TR2016/000072
§ 371 (c)(1),
(2) Date: Nov. 3, 2017

(87) PCT Pub. No.: WO2016/186595
PCT Pub. Date: Nov. 24, 2016

(65) Prior Publication Data
US 2018/0148354 A1 May 31, 2018

(30) Foreign Application Priority Data
May 20, 2015 (TR) .............................. a 2015/06030

(51) Int. Cl.
*C02F 1/46* (2006.01)
*C02F 1/469* (2006.01)
*C02F 1/461* (2006.01)

(52) U.S. Cl.
CPC .. *C02F 1/4691* (2013.01); *C02F 2001/46133* (2013.01); *C02F 2001/46171* (2013.01);
(Continued)

(58) Field of Classification Search
CPC ...... B01D 15/36; B01D 15/3885; B01J 47/08; C02F 1/4691; C02F 2301/024;
(Continued)

(56) References Cited

U.S. PATENT DOCUMENTS

| 5,415,768 A * | 5/1995 | Andelman | B01D 15/36 204/600 |
| 6,346,187 B1 * | 2/2002 | Tran | B82Y 30/00 205/342 |

(Continued)

OTHER PUBLICATIONS

International Search Report for PCT/TR2016/000072 filed May 20, 2016.
(Continued)

*Primary Examiner* — Walter D. Griffin
*Assistant Examiner* — Cameron J Allen
(74) *Attorney, Agent, or Firm* — Notaro, Michalos & Zaccaria P.C.

(57) ABSTRACT

The water treatment system (S) according to the present invention includes an electrosorption unit (E) comprising a body (G); a polluted water inlet (1) for supplying water received from the water source into the body (G); a clean water outlet (2) for discharging water received from the polluted water inlet (1) out of the body (G), after it is purified from foreign materials contained therein; at least two perforated plates (4) positioned in the body (G) such that at least one of them is close to the polluted water inlet (1) and at least the other one is close to the clean water outlet (2); and at least two electrodes (3) which are located in the body (G), with an insulating layer (6) in between, and which collect, through electrosorption method, foreign materials contained in the water received from the polluted water inlet (1) thereon, when electrical potential is applied, and which include activated carbon, and at least one power source (8) supplying to at least one of the electrodes (3) of the electrosorption unit (E) an electrical potential in the range of 0.5 to 1.5 V and to at least the other one, an electrical potential in the range of −0.5 to −1.5V.

13 Claims, 2 Drawing Sheets

(52) U.S. Cl.
CPC ............... *C02F 2201/4612* (2013.01); *C02F 2201/46145* (2013.01); *C02F 2209/003* (2013.01); *C02F 2209/06* (2013.01)

(58) Field of Classification Search
CPC .... G01N 30/50; G01N 30/6069; G01N 30/96; G01N 30/02; G01N 30/38; G01N 30/60; G01N 30/6043; G01N 30/6091; G01N 30/6095; G01N 30/80; G01N 2030/027; G01N 2030/965; G01N 2030/0035; G01N 30/466
See application file for complete search history.

(56) References Cited

U.S. PATENT DOCUMENTS

2004/0256231 A1* 12/2004 Barringer, Jr. ......... B01D 61/14
 204/451
2007/0284313 A1* 12/2007 Lee .................. C02F 1/4604
 210/746
2011/0042232 A1* 2/2011 Cai .................. C02F 1/4691
 205/687

OTHER PUBLICATIONS

International Preliminary Report and Written Opinion for PCT/TR2016/000072 filed May 20, 2016.
Laxman Karthik et al Desalination and 1-6, disinfection of inland brackish ground water in a capacitive deionization cell using nanoporous activated carbon cloth electrodes, Desalination, vol. 362, Feb. 16, 2015, p. 126-132.
Ania et al, Mechanism of adsorption and electrosorption of bentazone on activated carbon cloth in aqueous solutions, Water Research, Elsevier, Amsterdam, NL, vol. 41, No. 15, Jul. 11, 2007, p. 3372-3380.

* cited by examiner

ELECTROSORPTION SYSTEM FOR REMOVING FOREIGN MATERIALS FROM WATER

FIELD OF THE INVENTION

This invention relates to a water treatment system for removing organic and inorganic contaminants and microorganisms, which may be present in household water, mains water and pool water, from the water without using any chemicals.

BACKGROUND ART

In order to remove heavy metal ions from aqueous solutions, precipitation, ion exchange, reverse osmosis are extensively used in the prior art. And in order to remove organic compounds, aeration has been used for over a half century. However, this method only allows removal of volatile organic compounds. Organic contaminants are decomposed into products more perishable in nature by chemical oxidation performed using ozone, permanganate and chlorine and by photooxidation performed using UV/H2O2 or UV/TiO2. However, these methods require further processing, which results in an increase in cost; and also, toxic products that may be generated from decomposition causes secondary contamination.

A majority of the organic contaminants are toxic and resistant to aerobic digestion. Therefore, organic contaminants hinder bacterial growth in biological purification methods, thereby reducing efficiency of the method. The most common devices used in obtaining potable water are those operating based on reverse osmosis principle. Although this method is reliable and effective, its capacity is low and the membrane used therein is costly and due to its working principle, it produces more waste water than clean water, as a result of which the cost of the obtained water is high. Furthermore, devices that are produced using silica sand or micro filters are able to remove only solid particles of certain size, and more importantly, dissolved compounds such as pesticides cannot be removed.

Adsorption using mainly activated carbons as adsorbent is a more advantageous and the most frequently used method in the available devices, since it does not require complex and costly systems as compared to other methods, and particularly, chemically and biologically stable compounds may be removed by adsorption to a certain extent. On the other hand, regeneration of adsorbent is limited, the contaminants may only be removed to a certain extent and the capacity is low, which leads to an increase in the cost. Furthermore, adsorption typically takes a long time and due to microbiologic growth on the adsorbent, there is a smell problem with the water obtained.

Problems in relation with the household and pool water are listed below:
1. Organic chemicals
2. Microorganisms
3. Inorganic ions
4. pH Technically important parameters in solving these problems are as follows:
a) Removal rate
b) Efficiency
c) Capacity
d) Economic Among the current applications, reverse osmosis addresses the first 4 problems, but it is disadvantageous for the parameter d. Moreover, since it removes all ions in water, it causes secondary health problems resulting from mineral deficiency. The ion exchange method solves only the $3^{rd}$ problem. Although adsorption provides a partial solution for the $1^{st}$, $2^{nd}$ and $3^{rd}$ problems and is suitable for the parameter d, it is disadvantageous for the parameters a, b and c.

BRIEF DESCRIPTION OF THE INVENTION

With the present invention, there is provided a water treatment system for removing foreign materials from water obtained from a water source and containing foreign materials and for adjusting the pH value of the water. Said water treatment system comprises at least one electrosorption unit having at least one body; at least one polluted water inlet for supplying water received from the said water source into the body; at least one clean water outlet for discharging water received from the polluted water inlet out of the body, after it has been purified from foreign materials contained therein; at least two perforated plates positioned in the body such that at least one of them is close to the polluted water inlet and at least the other one is close to the clean water outlet; and at least two electrodes which are located in the body, with at least one insulating layer in-between, and which collect, through electrosorption method, foreign materials contained in the water received from the polluted water inlet thereon, when electrical potential (or current) is applied, and which include activated carbon, and at least one power source supplying to at least one of the electrodes of the electrosorption unit an electrical potential in the range of 0.5 to 1.5 V and to at least the other one, an electrical potential in the range of −0.5 to −1.5V.

With the electrosorption unit of the water treatment system according to the present invention, inorganic ions as well as organic microorganisms and microbiological contaminants contained in water are removed from the water without using any chemicals. Furthermore, thanks to the said electrosorption unit, pH of the water may be adjusted to the desired value so as to obtain potable water.

OBJECT OF THE INVENTION

An object of the invention is to provide a water treatment system used for purification of polluted water which operates based on electrosorption principle in household water or pool water.

Another object of the invention is to provide a water treatment system for removing not only organic and inorganic ions from water, but also microbiologic contaminants.

Still another object of the invention is to provide a water treatment system for obtaining potable water at the desired pH value.

DESCRIPTION OF THE DRAWINGS

The exemplary embodiments of the water treatment system according to the present invention are illustrated in the enclosed drawings, in which.

Figure 1:
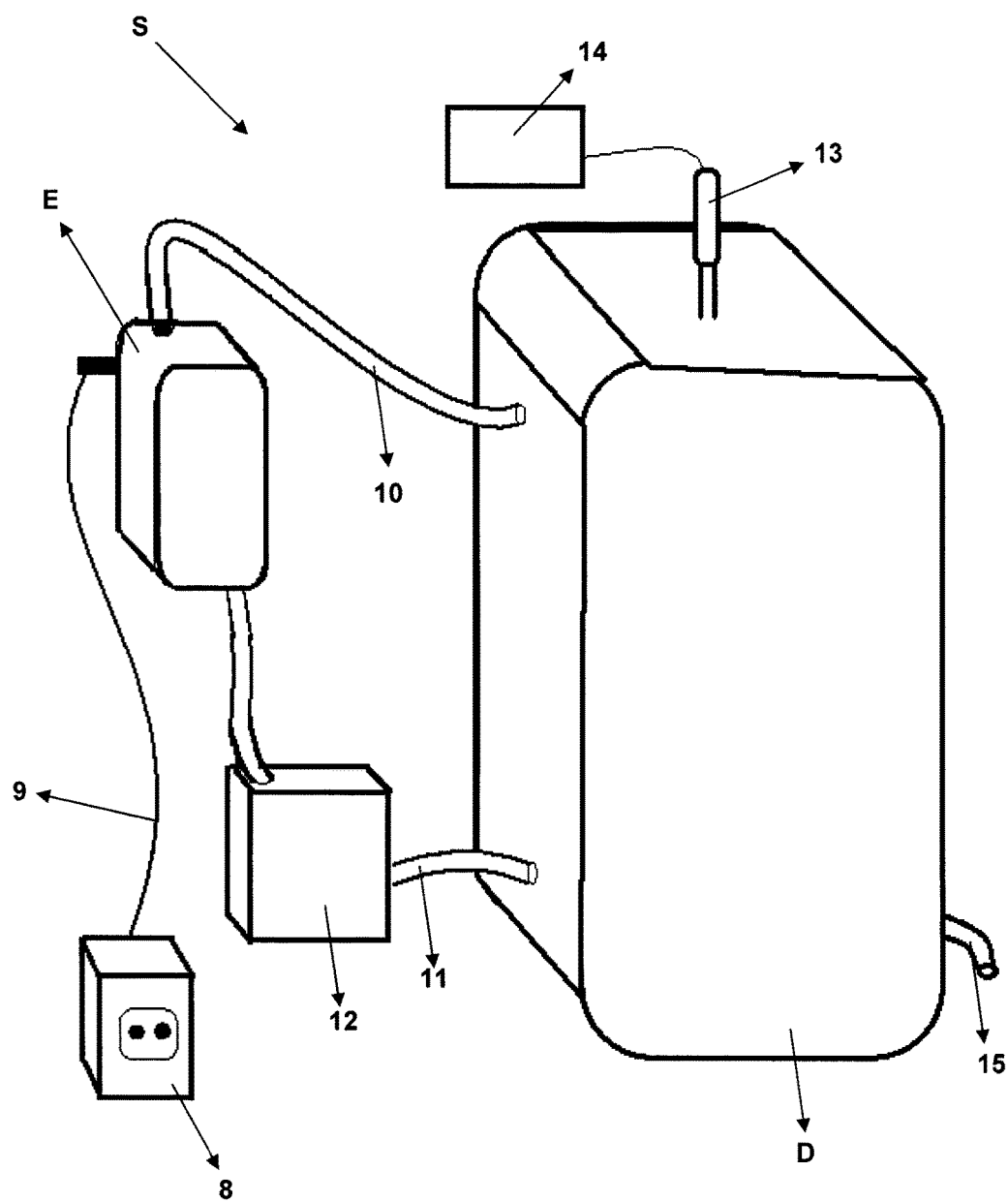
FIG. 1 is a schematic view of a water treatment system according to the present invention.

All the parts illustrated in the drawings are individually assigned a reference numeral and the corresponding terms of these numbers are listed as follows.

Water treatment system (S)
Water tank (D)
Electrosorption unit (E)
Body (G)
Polluted water inlet (1)
Clean water outlet (2)
Electrode (3)
Plate (4)
Electrode connection (5)
Insulating layer (6)
Connection member (7)
Power source (8)
Electrode connection line (9)
Polluted water transfer line (10)
Clean water transfer line (11)
Pump (12)
Sensor (13)
Indicator (14)
Outlet line (15)

DESCRIPTION OF THE INVENTION

It is important to remove foreign materials from aqueous solutions in order to make water usable. In prior art, various methods and systems are used to purify water. However, in traditional methods, water treatment is either costly or not efficient. Therefore, with the present invention, there is provided a water treatment system which is cost-effective and efficient.

Figure 2:
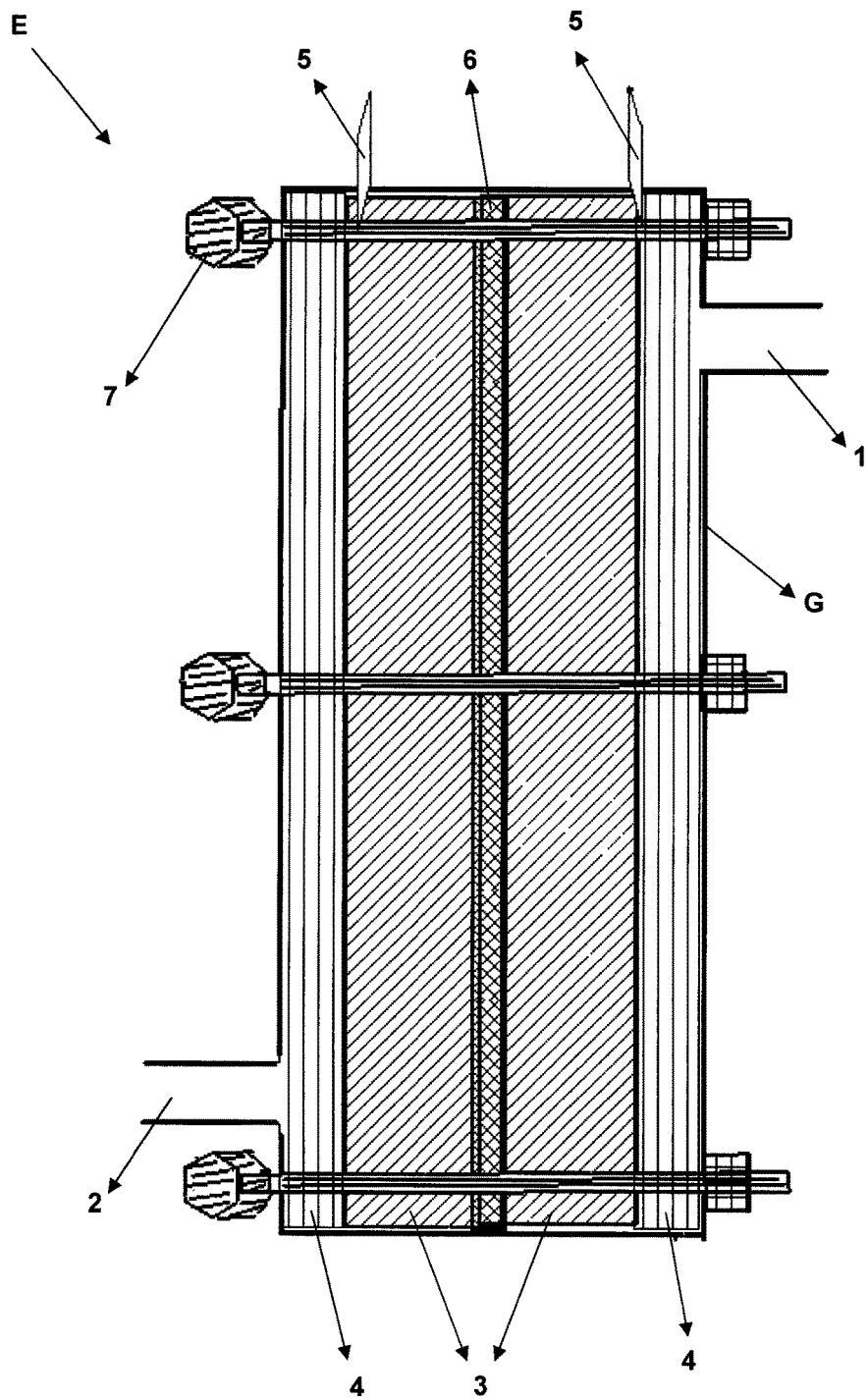
FIG. 2 is a side sectional view of an electrosorption unit of the water treatment system according to the present invention.

The water treatment system (S) according to the present invention, as illustrated in FIG. 1, allows removal of foreign materials from water (polluted water) received from a water source and containing such foreign materials, and adjustment of the pH value of the water. Said water treatment system (S) comprises at least one electrosorption unit (E) that serves to remove foreign materials and to adjust pH value. The electrosorption unit (E), shown in FIG. 2 in detail, comprises at least one body (G); at least one polluted water inlet (1) for supplying water received from the said water source into the body (G); at least one clean water outlet (2) for discharging water received from the polluted water inlet (1) out of the body (G), after it has been purified from foreign materials contained therein; at least two perforated plates (4) positioned in the body (G) such that at least one of them is facing to the polluted water inlet (1) and at least the other one is facing to the clean water outlet (2); and at least two electrodes (3) which are located in the body (G), with at least one insulating layer (6) in between, and which collect, through electrosorption (electro adsorption) method, foreign materials contained in the water received from the polluted water inlet (1) thereon, when potential is applied, and which include activated carbon. The said water treatment system (S) also comprises at least one power source (8) supplying to at least one of the electrodes (3) of the electrosorption unit (E) an electrical potential in the range of 0.5 to 1.5 V and to at least the other one, an electrical potential in the range of −0.5 to −1.5V.

In an illustrative embodiment of the invention, water received from a water source (i.e. a tap or a water tank (D)) and containing foreign materials is supplied from the polluted water inlet (1) into the body (G). The water introduced into the body (G) is conveyed onto at least one electrode (3) by at least one of the said plates (4). The perforated structure of the plate (4) ensures distribution of water on the electrode (3) so that electrosorption rate of the electrodes (3) is rendered high. When the electrodes (3) (at least one of which serves as anode and at least the other one serves as cathode) provided in the body (G) are applied potential by the power source (8), foreign materials contained in the water inside the body (G) are collected on the electrodes comprising activated carbon. Water purified from foreign materials contained therein is discharged from the body through the clean water outlet (2) and used. In this embodiment, since the electrical potential supplied to the electrodes (3) is in the range of 0.5 to 1.5 V/−0.5 to −1.5V, pH value of the water inside the body (G) is also adjusted.

In a preferred embodiment of the invention, the length of the electrodes (3) in the body (G) differs from each other. When a solid electrode is immersed in an aqueous electrolyte solution, a discontinuity takes place from the aqueous phase to the solid phase and the concentration of the electrolyte changes dramatically. An interface is generated because of the difference in chemical potential between the two phases and a charge separation takes place in this interfacial region. This charge separation is generated by dipolar molecules, polarized atoms, free electrons or ions. When the solid electrode is charged by an external source, the charge on the charged electrode is compensated by the ionic counter-charges in the solution section of the interface and eventually, ions and/or molecules accumulate on the interface. In this way, the interface is electrically neutral in its entirety. If the charge applied is increased, an ion and/or polar molecule movement takes place from the solution to the electrode surface so as to provide a charge balance on the interface, due to electrostatic interactions or ion-dipole interactions. Therefore, the larger the surface area of an electrode (3), the higher the amount of the ion/molecule which moves from the solution to the electrode surface. This is called as an electrosorption process. Depending on the type and features of the electrode used, this process is maintained until a potential value is reached at which electrochemical charge transfer takes place. Until this potential is reached, the amount of the total charge stored on the surface of the electrode (3) is known as capacitance. After this potential value, Faradaic reactions also start, along with the electrosorption process. In the water treatment system (S) according to the present invention, at least two electrodes (3) are present, at least one of which is anode and at least the other one is cathode. Here, in case the length of the electrode (3) (anode) supplied with an electrical potential in the range of 0.5 to 1.5 V is higher than that of the electrode (3) (cathode) supplied with an electrical potential in the range of −0.5 to −1.5 V, pH value of the water is increased in the electrosorption process. On the contrary (in case the length of the cathode electrode (3) is higher than that of the anode electrode (3)), pH value of the water is decreased. Thus, by adjusting the duration of the electrosorption process, pH of the water is brought to the desired value.

In another preferred embodiment of the invention, said electrosorption unit (E) comprises at least one connection member (7) holding together the plates (4), the electrodes (3) and the insulating material (6) located in the body (G). Preferably, said connection member (7) is in the form of a screw. In this embodiment, the connection member (7) prevents dislocation of the plates (4), electrodes (3) and insulating material (6) so as to prevent damage to the electrosorption unit (E), for example due to a short circuit of the electrodes (6).

In another preferred embodiment of the invention, the electrosorption unit (E) comprises at least two electrode connections (5) each being connected with at least one electrode (3) at one side and at least other side of which projects from the body (G). In this embodiment, the water treatment system (S) comprises at least two electrode connection lines (9) each being connected to the said power source (8) at one side and at the other side, connected to the electrode connection (5), and supplying electrical potential received from the power source (8) to the electrodes (3) through the electrode connections (5). Said electrode connection lines (9) are preferably in the form a cable.

In another preferred embodiment of the invention, the water treatment system (S) comprises at least one tank (D) wherein water that contains foreign materials is stored; at least one polluted water transfer line (10) through which the water inside the tank (D) is transferred to the polluted water inlet (1) in the electrosorption unit (E); and at least one pump (12) for receiving, through the said clean water outlet (2), the water purified from the foreign materials therein in the electrosorption unit (E) and sending it back to the tank (D) through at least one clean water transfer line (11). In this embodiment, said tank (D) serves as a water source. Polluted water received from the tank (D) is cleaned in the electrosorption unit (E) and sent back to the tank (D). Circulation of the water between the tank (D) and the electrosorption unit (E) allows the water in the tank (D) to be cleaned. In this embodiment, said tank (D) may be a water chamber or a structure like a pool.

In an illustrative embodiment of the invention, the water treatment system (S) comprises at least one sensor (13) located in the said tank (D) and measuring pH and cleanliness values of the water inside the tank (D). Said sensor (13) is able to determine the cleanliness level of the water by measuring the conductivity value thereof. In this embodiment, said sensor (13) may be connected with at least one indicator (14) wherein the results of the measurement are visually presented to the users. Thus, the water inside the tank (D) is circulated between the tank (D) and electrosorption unit (E) until it reaches to the desired pH and cleanliness values. In an alternative embodiment, said sensor (13) is connected with at least one control unit (not shown) controlling operation of the said pump (12). In this embodiment, the control unit enables operation of the pump (12) until the pH and cleanliness values measured by the sensor (13) reach to the desired level. In this manner, the water inside the tank (D) is brought to the desired pH and cleanliness value without the need for observance of a user. Said tank (D) also comprises at least one outlet line (15) for removing water from the tank (D) after the water therein has reached to the desired pH and cleanliness value. In this way, the purified water inside the tank (D) is supplied to the users.

In an illustrative embodiment of the invention, said electrodes (3) comprise activated carbon granules spaced from each other and polyethylene holding said granules together. In a preferred embodiment, the weight percent of the activated carbon granules is 85% and that of the polyethylene is 15%.

In an alternative embodiment of the invention, said electrosorption unit (E) comprises a plurality of electrodes (3) connected to each other in series or in parallel. In an alternative embodiment of the invention, said electrodes (3) has a cylindrical form. In the said cylindrical form, one of the electrodes (3) has a hollow cylindrical form, and the other electrode (3) has a cylindrical form received in the said hollow.

With the electrosorption unit (E) of the water treatment system (S) according to the present invention, organic molecules, organic and inorganic ions as well as microorganisms contained in water are removed from the water without using any chemicals. Furthermore, thanks to the said electrosorption unit (E), pH of the water may be adjusted to the desired value so as to obtain potable water.

The invention claimed is:

1. A water treatment system (S) for removing foreign materials from water obtained from a water source and containing foreign materials and for adjusting the pH value of the water, characterized by comprising:

at least electrosorption unit (E) comprising at least one body (G); at least one polluted water inlet (1) for supplying water received from the said water source into the body (G); at least one clean water outlet (2) for discharging water received from the polluted water inlet (1) out of the body (G), after it has been purified from foreign materials contained therein; at least two perforated plates (4) positioned in the body (G) such that at least one of them is facing to the polluted water inlet (1) and at least the other one is facing to the clean water outlet (2); and at least two electrodes (3) which are located in the body (G), with at least one insulating layer (6) in between, and which collect, through electrosorption method, foreign materials contained in the water received from the polluted water inlet (1) thereon, when potential is applied, and which include activated carbon, wherein said perforated plates (4) distribute water on the electrodes (3) in order to increase electrosorption rate, and wherein the length of the said electrodes (3) differs from each other, at least one power source (8) supplying to at least one of the electrodes (3) of the electrosorption unit (E) an electrical potential in the range of 0.5 to 1.5 V and to at least the other one, an electrical potential in the range of −0.5 to −1.5V.

2. A water treatment system (S) according to claim 1, characterized in that the said electrosorption unit (E) comprises at least one connection member (7) holding together the plates (4), the electrodes (3) and the insulating material (6) located in the body (G).

3. A water treatment system (S) according to claim 2, characterized in that the said connection member (7) is in the form of a screw.

4. A water treatment system (S) according to claim 1, characterized in that the electrosorption unit (E) comprises at least two electrode connections (5) each being connected with at least one electrode (3) at one side and each projecting from the body (G) at the other side.

5. A water treatment system (S) according to claim 4, characterized by comprising at least two electrode connection lines (9) each being connected to the said power source (8) at one side and each being connected to the electrode connection (5) at the other side and supplying electrical potential received from the power source (8) to the electrodes (3) through the electrode connections (5).

6. A water treatment system (S) according to claim 1, characterized by comprising at least one tank (D) wherein water that contains foreign materials is stored; at least one polluted water transfer line (10) through which the water inside the tank (D) is transferred to the polluted water inlet (1) in the electrosorption unit (E); and at least one pump (12) for receiving, through the said clean water outlet (2), the water purified from the foreign materials therein in the electrosorption unit (E) and sending it back to the tank (D) through at least one clean water transfer line (11).

7. A water treatment system (S) according to claim 6, characterized by comprising at least one sensor (13) located in the said tank (D) and measuring pH and cleanliness values of the water inside the tank (D).

8. A water treatment system (S) according to claim 7, characterized by comprising at least one indicator (14)

which is connected with the said sensor (13) and which visually presents to the users the measurement results obtained by the sensor (13).

9. A water treatment system (S) according to claim 7, characterized by comprising at least one control unit which is connected with the said sensor (13) and which controls operation of the pump (12) based on the measurement results obtained by the sensor (13).

10. A water treatment system (S) according to claim 6, characterized by comprising at least one outlet line (15) located in the said tank (D).

11. A water treatment system (S) according to claim 1, characterized in that the said electrodes (3) comprise activated carbon granules spaced from each other and polyethylene holding said granules together.

12. A water treatment system (S) according to claim 1, characterized in that the said electrosorption unit (E) comprises a plurality of electrodes (3) connected to each other in series or in parallel.

13. A water treatment system (S) according to claim 1, characterized in that the said electrodes (3) have a cylindrical form.

* * * * *